(12) United States Patent
Holloway et al.

(10) Patent No.: US 6,318,771 B1
(45) Date of Patent: Nov. 20, 2001

(54) FUEL FILLER DOOR ACTUATOR

(75) Inventors: John C. Holloway, Cumberland, RI (US); John D. Murray, Wellesley; Joseph R. Colleran, Braintree, both of MA (US)

(73) Assignee: Stoneridge Control Devices, Inc., Canton, MA (US)

( * ) Notice: Subject to any disclaimer, the term of this patent is extended or adjusted under 35 U.S.C. 154(b) by 0 days.

(21) Appl. No.: 09/621,406

(22) Filed: Jul. 21, 2000

Related U.S. Application Data

(60) Provisional application No. 60/145,060, filed on Jul. 22, 1999.

(51) Int. Cl.[7] .................................................. E05B 15/02
(52) U.S. Cl. ............... 292/341.16; 292/201; 292/DIG. 4
(58) Field of Search .............................. 292/201, 341.16, 292/DIG. 4, DIG. 43; 296/97.22; 49/280

(56) References Cited

U.S. PATENT DOCUMENTS

| | | | |
|---|---|---|---|
| 3,332,713 | * 7/1967 | Claire | 292/201 |
| 3,915,491 | * 10/1975 | Montgomery | 296/1 |
| 4,702,506 | 10/1987 | Iimura | 292/251.5 |
| 4,703,960 | * 11/1987 | Lense | 292/69 |
| 4,709,949 | 12/1987 | Umuzawa et al. | 292/6 |
| 4,782,978 | 11/1988 | Applyby et al. | 220/335 |
| 4,792,165 | 12/1988 | Nishimura | 292/19 |
| 4,811,984 | 3/1989 | Hempel | 296/97.22 |
| 4,905,528 | * 3/1990 | Kawaguchi | 74/102 |
| 5,002,322 | 3/1991 | Fukumoto | 292/341.16 |
| 5,044,678 | 9/1991 | Detweiler | 292/144 |
| 5,050,922 | * 9/1991 | Falcoff | 296/37 |
| 5,072,974 | * 12/1991 | Henne | 292/126 |
| 5,114,197 | 5/1992 | Persiani | 292/336.3 |
| 5,158,330 | 10/1992 | Weyerstall et al. | 292/144 |
| 5,165,749 | 11/1992 | Sheppard | 296/97.22 |
| 5,217,262 | 6/1993 | Kurosaki | 292/6 |
| 5,222,774 | * 6/1993 | Fukumoto | 292/144 |
| 5,518,223 | 5/1996 | Bivens | 267/34 |
| 5,836,638 | 11/1998 | Slocum | 296/97.22 |
| 5,845,954 | 12/1998 | Depue | 296/37.12 |

\* cited by examiner

Primary Examiner—Gary Estremsky
(74) Attorney, Agent, or Firm—Hayes, Soloway, Hennessey, Grossman & Hage P.C.

(57) ABSTRACT

A fuel filler door actuator is provided having a locking arm and an alternate action mechanism. The locking arm is selectively driveable by an electric motor to engage or disengage with the fuel filler door of an automobile. The alternate action mechanism, including a spring-biased plunger having a cam track with a cam follower riding in the track, is engageable by and mounted adjacent to the fuel filler door and is capable of linear movement with respect to the door by alternating between an inward recessed position and an outwardly extended position each time an inward force is applied to the door. In the event of a loss of electrical power to the actuator, a manual override mechanism is provided which allows unpowered opening of the fuel door.

20 Claims, 5 Drawing Sheets

FUEL FILLER DOOR ACTUATOR

CROSS-REFERENCE TO RELATED APPLICATIONS

The present application claims the benefit of the filing date of U.S. Provisional patent application Ser. No. 60/145,060, filed Jul. 22, 1999, the teachings of which are incorporated herein by reference.

FIELD OF THE INVENTION

The present invention relates in general to an actuator, and, in particular, to a fuel filler door actuator for controlling the lock state of an automobile fuel filler door.

BACKGROUND OF THE INVENTION

Conventional automobile fuel filler doors may or may not be equipped with a locking mechanism for preventing access to the fuel tank through the fuel filler assembly. Locking fuel filler doors are, however, becoming favored over the non-locking versions, especially in relatively expensive automobiles and in locations where fuel costs are relatively high. By locking the fuel filler door, an automobile owner may prevent fuel theft and vandalism by introduction of damaging contaminants to the fuel tank.

Known locking mechanisms for fuel filler doors include: key locks, cable release assemblies, and solenoid assemblies. Key locks are assembled directly to the fuel filler door, and are opened using a key, e.g., the ignition key. Key locks, however, create the potential for lock "freeze-up" or lock corrosion that can prevent all entry to the fuel filler. These locks also possess undesirable styling features.

Cable release systems generally include a mechanical door latch that is released by manipulation of a cable, e.g., inside the automobile passenger compartment. As these systems age, however, they often require excessive manual force for opening the door. In addition, extensive cable routing is required when the system is installed.

Solenoid systems generally have a single action, spring return motion for releasing a door which is spring biased to open. These systems require high current draw and specific dedicated wiring and switching. In addition, solenoid systems require significant space for mounting and are relatively expensive.

Thus, prior art fuel filler door locking mechanisms suffer from a variety of disadvantages. Generally, these mechanisms do not provide for convenient and reliable operation. In addition, these mechanisms require difficult, expensive, and cumbersome installation.

There is, therefore, a need in the art for a cost-effective, compact, and reliable fuel filler door lock actuator that may be conveniently operated and efficiently assembled to an automobile.

OBJECTS OF THE INVENTION

Thus, it is an object of the present invention to provide a cost-efficient, compact, and reliable fuel filler door actuator.

It is another object of the present invention to provide a fuel filler door actuator that may be operated through an automobile central door locking system.

It is another object of the present invention to provide a fuel filler door actuator which may be operated through an automobile central door locking system and which has a reliable and effective manual override mechanism.

It is another object of the present invention to provide a fuel filler door actuator for controlling the lock state of a fuel filler door having an exterior surface which is flush to the automobile exterior body panels, thereby improving styling by obviating the need for a finger access dimple or a pull tab on the door.

It is still another object of the present invention to provide a fuel filler door actuator that is inherently locking and tamper resistant.

Yet another object of the invention is to provide a fuel filler door actuator that may be conveniently installed by mounting to the automobile fuel filler assembly.

Yet a further object of the invention is to provide a fuel filler door actuator that is cost-effective to produce and install.

These and other objects of the present invention will become apparent from a review of the description provided below.

SUMMARY OF THE INVENTION

The present invention is organized about the concept of providing a fuel filler door lock actuator that is compact, reliable, and cost-effective. The actuator includes a locking arm and an alternate action ("push-push") mechanism. The locking arm is selectively driveable by an electric motor to engage or disengage with the fuel filler door of an automobile. The alternate action mechanism, including a spring-biased plunger having a cam track with a cam follower riding in the track, is engageable by and mounted adjacent to the fuel filler door and is capable of linear movement with respect to the door by alternating between an inward recessed position and an outwardly extended position each time an inward force is applied to the door. In the event of a loss of electrical power to the actuator, a manual override mechanism is provided which allows unpowered opening of the fuel door.

In particular, an actuator consistent with the invention includes an alternate action mechanism having a plunger portion configured for mounting adjacent a fuel filler door. The plunger portion is configured to move alternately between a first inward position and an outward position upon application of a force thereto through the door. A locking arm is coupled to an electric motor through a gear train. The arm is positionable in a door lock condition by energization of the motor in a first direction when the plunger portion is in the inward position. The motor may be substantially sealed in a cavity in the housing.

To provide manual override, the plunger may be positionable in a second inward position that is further inward relative to the housing than the first inward position. The plunger may include a portion positioned to contact a gear in the gear train, or a feature on the gear, when the plunger is in the second inward position for rotating the gear and thereby moving the arm from the door lock condition to a door unlock condition. In one embodiment, the plunger is positioned to contact an override tooth on the gear, the override tooth being larger than a plurality of drive teeth on the gear. In another embodiment, the plunger is positioned to contact a feature on a face of the gear.

The actuator may further include a cam follower that rides in a cam track in the plunger. For manual override, the cam track may have an override portion, the cam follower having a portion disposed in the override portion when the plunger is in the second inward position. The cam track may include an open portion at a bottom of the plunger to facilitate assembly of the actuator.

The gear train may include an output gear coupled to the arm through an eccentric pin. The eccentric pin may include a portion disposed in a slot in the locking arm, and the locking arm may be pivotable about a first end connected to a housing through a pin. A second end of the arm may be positioned for engaging a portion of the fuel filler door. The coupling of the locking arm to the gear train through the eccentric pin provides "tamper resistance", since the gear train may not be back driven by a force applied to the second end of the arm.

BRIEF DESCRIPTION OF THE DRAWING

For a better understanding of the present invention, together with other objects, features and advantages, reference should be made to the following detailed description which should be read in conjunction with the following figures wherein like numerals represent like parts.

DETAILED DESCRIPTION OF THE INVENTION

Figure 1:
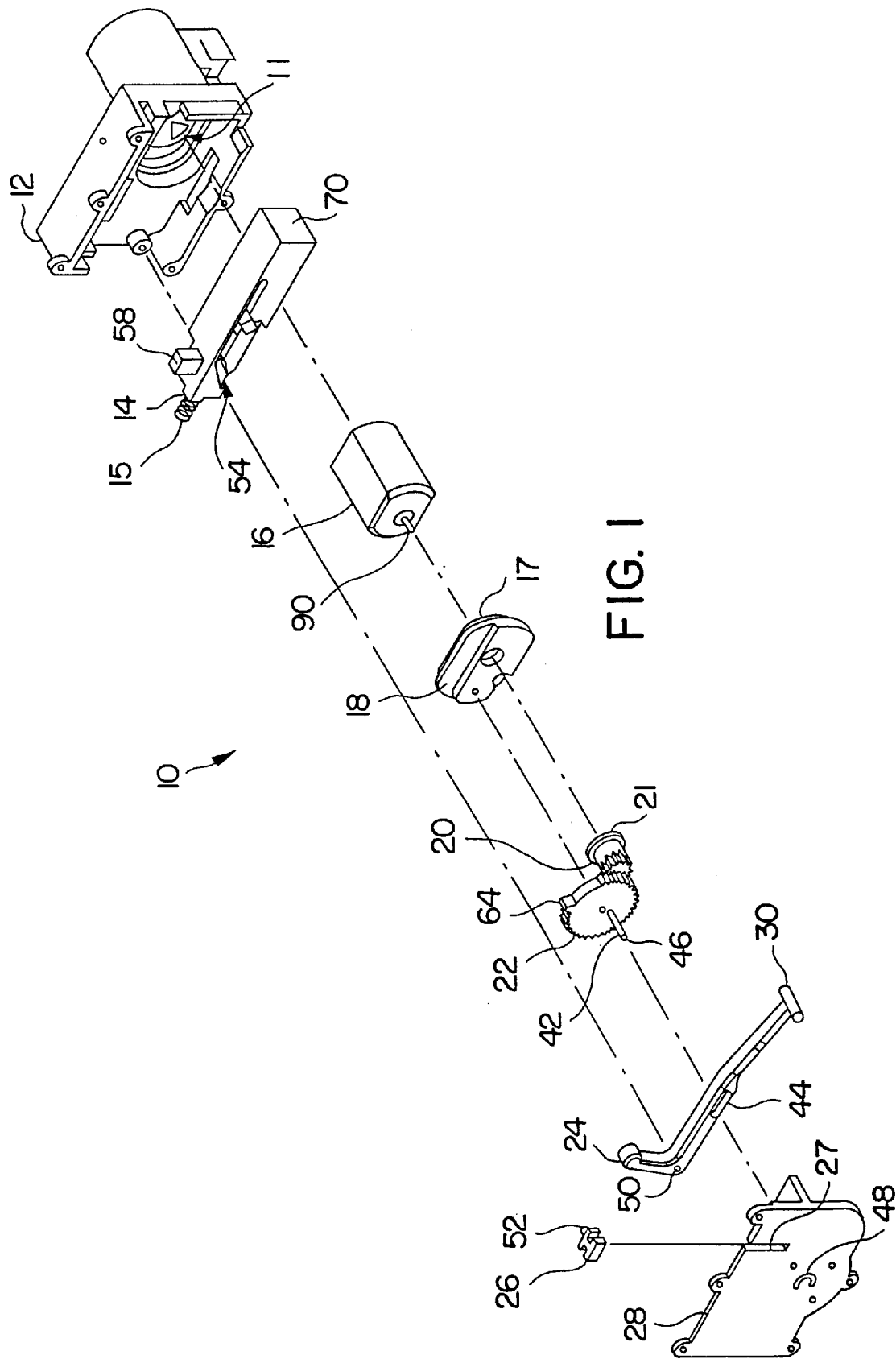
FIG. 1 is an exploded view of an exemplary actuator according to the invention.
Figure 2:
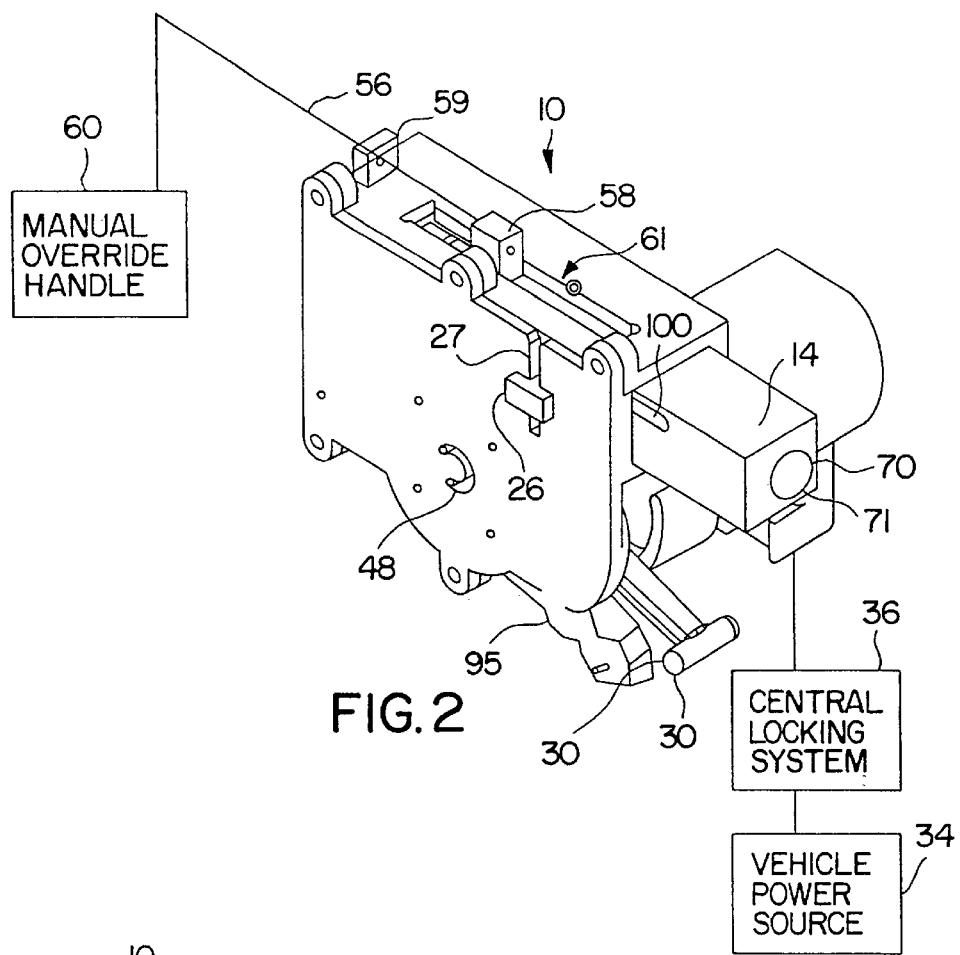
FIG. 2 is a perspective view of the actuator illustrated in FIG. 1.
Figure 3:
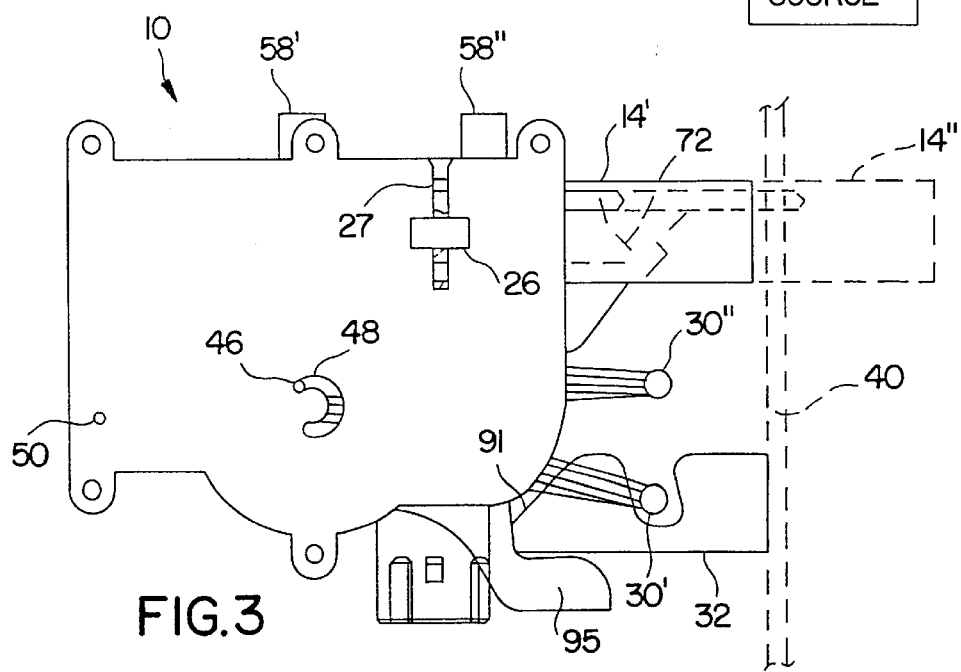
FIG. 3 is a side view of the actuator illustrated in FIG. 1.

Referring now to FIGS. 1–3, there is shown an exemplary fuel filler door actuator according to the invention. As shown, an exemplary actuator 10 in accordance with the present invention includes: a housing 12; a plunger 14; a compression spring 15 biasing the plunger in direction outward from the housing; a reversible fractional horsepower DC motor 16; a motor cover 18; o-rings 17 and 21; a pinion gear 20 driven by the motor; an output gear 22 coupled to the pinion gear; a locking arm 24; a cam follower 26 for riding in cam track 54 in plunger 14; and a housing cover 28. In the illustrated exemplary embodiment, motor cover 18 and O-rings 17,21 seal the motor 16 within a cavity 11 in the housing 12. O-ring 17 seals the cover-to-housing interface, and o-ring 21 seals the motor shaft-to-housing interface. Sealing the motor serves the function of keeping the motor sufficiently insulated from potentially combustible materials in the environment around the motor. In addition, sealing the motor prevents entry of contaminants that could cause motor malfunction.

The illustrated exemplary embodiment of the invention will first be described in broad general terms with a more detailed description to follow. In general, the actuator 10 locks/unlocks a vehicle fuel door 40 (FIG. 3) by allowing selective engagement and disengagement of an end 30 of locking arm 24 with a catch 32 on fuel filler door 40. Motion of the locking arm 24 is achieved by connecting the motor 16 to the vehicle power source 34, e.g. through the vehicle central locking system 36. When the motor 16 is energized, the pinion gear 20 drives the output gear 22. The eccentric pin 42 extending from the face of the output gear extends through a slot 44 in locking arm 24, and its end 46 rests in an over-center slot 48 in the cover 28. As the output gear 22 is rotated, the pin 42 travels in the slot 44 to cause pivoting of the locking arm 24 about a pin 50 fixed to the housing 12 and corresponding movement of the end 30 of the locking arm from a locked position 30'(FIG. 3) to an unlocked position 30", depending on the direction of rotation of motor shaft 90. When the actuator is in an unlocked mode, it presents the fuel door 40 to a user using an alternate action, push-to-open/push-to-close (or "push-push") mechanism provided generally by the spring-biased plunger 14 and the travel of the end 52 of the cam follower 26 within the cam track 54. A manual override mechanism, described below, is provided for allowing unpowered operation, e.g., in the event of a loss of electrical power.

With reference now to FIGS. 3–6, the alternate action mechanism of an exemplary actuator consistent with the invention will now be described in further detail. The illustrated embodiment may be useful in conjunction with flush fuel filler doors (i.e. doors having no finger access dimples or pull tabs) with an over-center spring, which biases the door alternately open or closed. Those skilled in the art will recognize, however, that an actuator according to the invention may be adapted for use with other fuel filler door arrangements, e.g., a door with a spring clip that engages a feature on the end of the plunger, or a plunger with a spring clip that engages a feature attached to the door.

In the case of a door with an over-center spring (not shown), the door is held in the closed position by the over-center spring. In this position, the door may rest on, or be adjacent to, an elastomer bumper 71 on the end 70 of the plunger. The plunger is held in a door closed position 14' by pressing engagement of a front portion 72 of the cam track 54 against a surface of the end 52 of the cam follower 26. In the illustrated embodiment, the cam follower is slidably disposed in a slot 27 in the housing cover. Those skilled in the art will recognize other configurations for the cam follower 26. For example, in another embodiment, plunger 14 could move up and down with respect to a fixed cam follower, instead of the cam follower 26 moving up and down in track 54.

Figure 4:
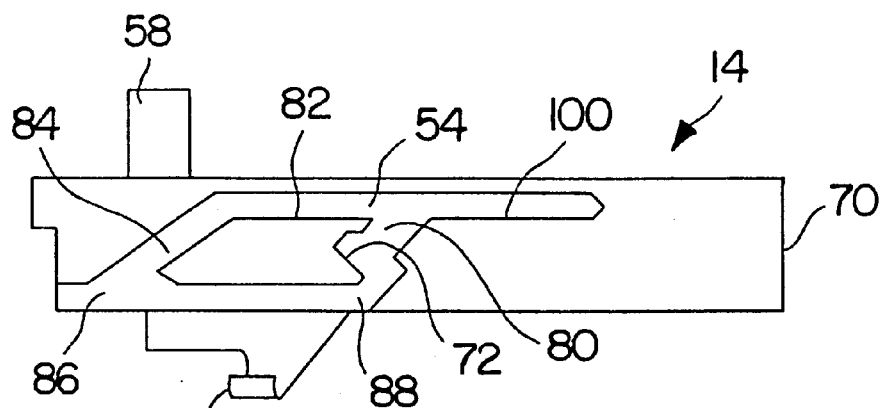
FIG. 4 is a side view of an exemplary plunger for use in conjunction with an exemplary actuator according to the invention.
Figure 5:
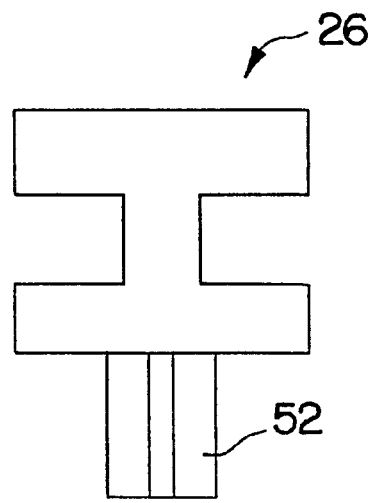
FIG. 5 is a top view of an exemplary cam follower for use in conjunction with an exemplary actuator according to the invention.
Figure 6:
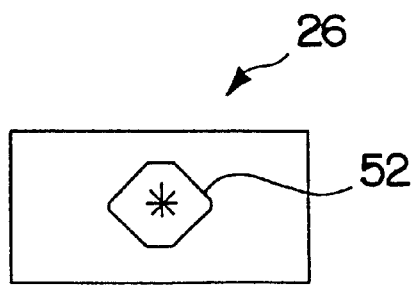
FIG. 6 is an end view of the cam follower illustrated in FIG. 1.

To open the fuel filler door, the exterior surface of the door is forced inward. This depresses the plunger 14 and its outwardly biasing compression spring 15, thereby causing the cam follower 26 to move upward in the slot 27 and the track 54 and through the portion 80 of the track 54 (FIG. 4). When the follower 26 reaches the upper portion 82 of the track 54, the plunger 14 is forced outward from the housing 12 by the spring 15. The follower 26 travels through the upper portion 82 and then down through an end portion 84 to a bottom portion 86 of the track 54. The spring 15 thus extends the plunger 14 to push the door open in opposition to the door's over-center spring. The door is held open by the extended plunger to permit a user to insert fingers behind the door to pull it open against the force of the over-center spring. When the door is fully opened, the over-center spring biases the door in the open position.

To close the door, the door is pivoted in the closing direction by the operator. As the door is pivoted, the over-center spring provides a force to urge the door toward the closed position. The door stops closing when it meets the end 70 of the extended plunger 14, which is held in the "door open" position by the plunger coil spring 15 and the positioning of the cam follower 26 in the bottom portion 86 of the track 54. The bumper 71 on the end 70 of the plunger may absorb the impact of the door 40 on the plunger. As additional force is applied to the door, the plunger 14 is forced toward its closed position against the bias of the spring 15, and the end of the cam follower 26 slides along the bottom portion 86 of the track to the opening 88 of the front portion 80 of the track.

When the door is released, the spring 15 forces the plunger 14 outward to return the door to the body flush position, and forces the end of the cam follower 26 to travel upward to rest in the portion 72 of the track 54. Thus, the ends of travel for the plunger are defined by the cam track profile in the plunger. In the illustrated embodiment, the track is similar to what is commonly referred to as a heart cam. The bottom of the cam track 54 is open in the illustrated embodiment, which advantageously makes the actuator of this embodiment easier to assemble. In particular, the plunger may be positioned over the follower 26 after the follower is positioned in the slot 27.

The alternate action mechanism would operate similarly in a door with a spring clip (not shown). If such a door were used, the door may be held in the closed position by the spring clip, which would engage a feature on the end of the plunger. When the plunger is placed into an open position, pulling on the door would overcome the spring clip to free the door for opening the rest of the way. The door would then be held open by friction or a mechanical detent. As the door is closed, the spring clip would again engage the feature on the end of the plunger.

Figure 7:
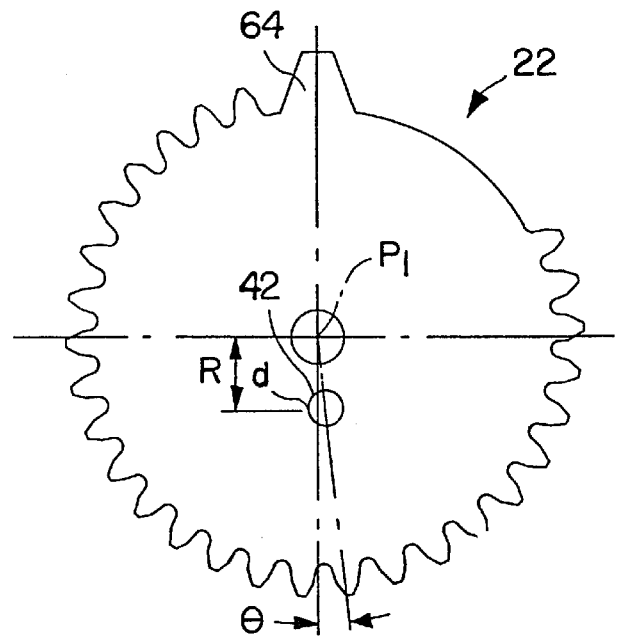
FIG. 7 is a front view of an exemplary output gear for use in conjunction with an exemplary actuator in accordance with the present invention.
Figure 8:
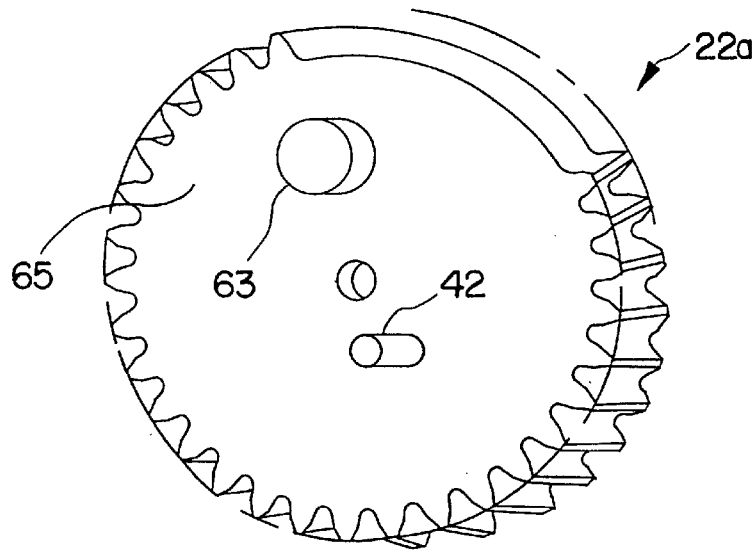
FIG. 8 is a front view of another exemplary output gear for use in conjunction with an exemplary actuator in accordance with the present invention.
Figure 9:
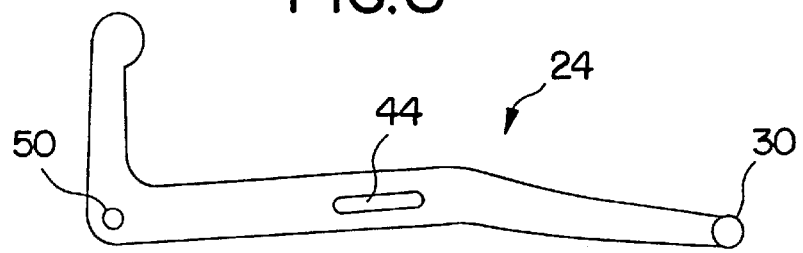
FIG. 9 is a side view of an exemplary locking arm for use in conjunction with an exemplary actuator in accordance with the present invention.

With continuing reference to FIGS. 1–3, and also to FIGS. 7–8, an exemplary door locking mechanism consistent with the invention will now be described in further detail. The door locking mechanism generally includes motor 16, pinion gear 20 which is coupled to the motor output shaft 90 for rotation therewith, output gear 22 coupled to the pinion gear 20, locking arm 24, and housing cover 28. In the illustrated embodiment, the eccentric pin 42 extends through the slot 44 in the locking arm 24 with its end 46 positioned in the over-center slot 48 of the housing cover 28. As output gear 22 rotates, eccentric pin 42 travels within slot 44 and over-center slot 48, forcing locking arm 24 to pivot about pin 50 with the end 30 of locking arm 24 moving between the unlocked 30" and locked 30' positions shown in FIG. 3. When the end 30 of locking arm 24 is in the unlocked position 30", the end 46 of pin 42 is positioned in the top of over-center slot 48, thereby resisting motion of arm 24 toward the locked position 30'.

Although in the illustrated embodiment, the end of the pin 42 is supported in the slot 48, those skilled in the art will recognize that this configuration is not necessary. The slot 48 simply provides support for the end of the pin during operation. Where such support is deemed useful or necessary, other means of support could be provided. For example, a support surface may be formed on the interior of the housing.

The positioning of the pin 42, as well as the dimensions of the slot 44, effect the range of motion in the end of the arm, and may be adjusted depending on the requirements of the particular application. As shown in FIG. 7, however, in one embodiment, pin 42 may be positioned at a distance d of about 0.12" from the center point P1 of the gear 22 and about 6.1 degrees from the gear centerline that passes through the center of the override tooth 64. An advantage of this configuration is that it is "tamper-resistant", since the eccentric positioning of the pin 42 and the pivoting of the arm 24 about pin 50 prevent the arm from manually being moved from locked position 30' to unlocked position 30".

Figure 10:
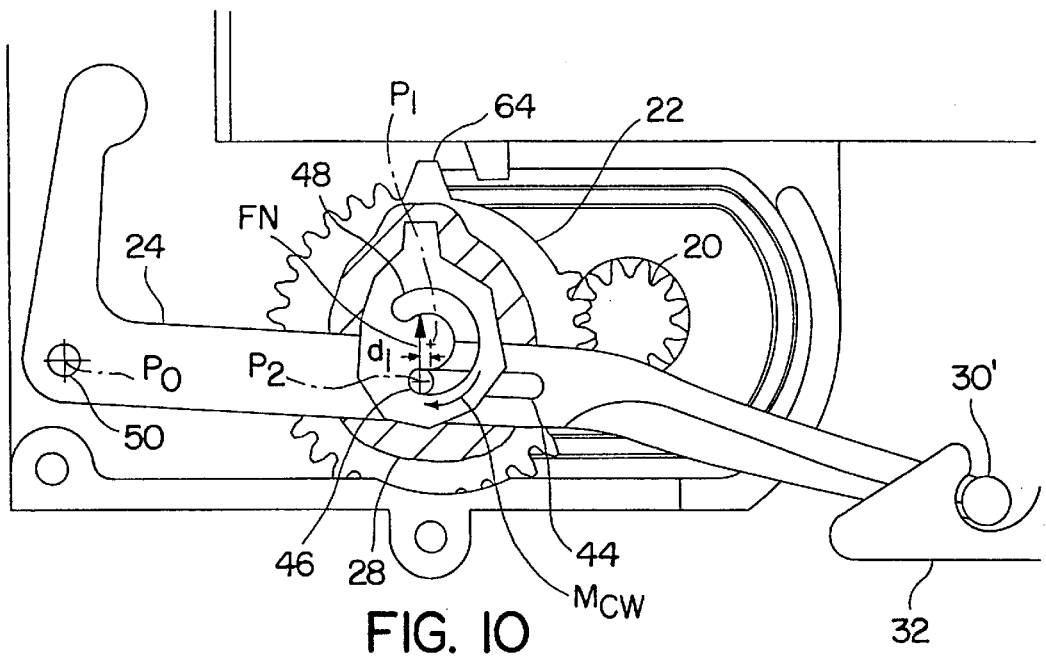
FIG. 10 is a partial sectional view of a portion of an exemplary actuator consistent with the invention illustrating the locking arm in a "locked" position.

In particular, with reference to FIG. 10, when the arm 24 is in the "locked" position 30', a force imparted to end 30 of the arm results in a force $F_N$ which is normal to the bottom surface of the slot 44. If the distance $d_1$ from the center point $P_2$ of the pin 46 to the center point $P_1$ of the gear 22 is greater than zero, a clockwise moment $M_{CW}$ is generated due to the fixed pivot point $P_0$ of the arm about pin 50. The clockwise moment causes the arm to maintain its locked state upon application of an external force to the end of the arm.

Figure 11:
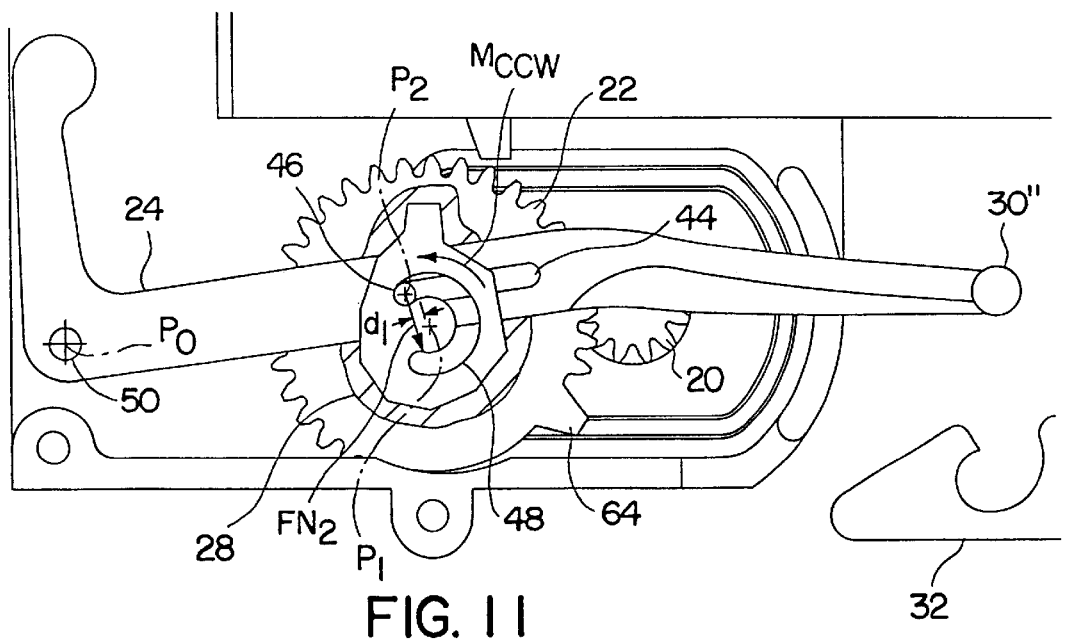
FIG. 11 is a partial sectional view of a portion of an exemplary actuator consistent with the invention illustrating the locking arm in an "unlocked" position.

Likewise, with reference to FIG. 11, when the arm 24 is in the "unlocked" position 30", a force imparted to end 30 of the arm results in a force $F_{N2}$ which is normal to the top surface of the slot 44. If the distance $d_1$ from the center point $P_2$ of the pin 46 to the center point $P_1$ of the gear 22 is greater than zero, a counter clockwise moment $M_{CCW}$ is generated due to the fixed pivot point $P_0$ of the arm about pin 50. The counter clockwise moment causes the arm to maintain its unlocked state upon application of an external force to the end of the arm.

Operationally, the locking sequence starts with door 40 in the closed position, but with locking arm 24 secured in the unlocked position 30" by output gear 22. Motor 16 may be energized to drive output gear 22, thereby causing locking arm 24 to pivot from the unlocked position 30" to the locked position 30' with pin 42 traveling in slot 44 and from the top of over-center slot 48 to the bottom of over-center slot 48. As discussed above, the locking arm 24 is secured into the locked position 30' (i.e. providing tamper resistance) due to the eccentric positioning of the pin 42 on the output gear 22.

Once the door is locked, it is held from being pulled open by engagement of the end 30 of locking arm 24 with the catch 32 on the door 40, and the door cannot be pushed far enough inward to change the state of the alternate action mechanism. To unlock the door, alternate polarity is applied to motor 16, e.g., through the vehicle central locking mechanism 36, and the locking arm motion is reversed.

Advantageously, the catch 32 and the locking arm 24 may be configured to allow the door to close even if locking arm 24 has already been moved to the locked position with the door open, i.e., the arm is in the locked position 30' but the end 30 of the arm is not engaged by catch 32. In this condition, as the door is pushed closed, an angled surface 91 on catch 32 can deflect locking arm 24 upward far enough to allow it to engage the catch 32 and establish a locked condition. A shelf 95 (FIGS. 2–3) may also be provided to prevent door 40 from being driven downwardly by the locking arm 24 during normal operation or while closing with the locking arm 24 in a "locked" position, further rendering the actuator tamper-resistant.

An actuator consistent with the invention may also include a manual override feature. In the illustrated exemplary embodiment, a first end of an override cable 56 may be attached to an upwardly extending tab 58 on top of the plunger 14. A second end of the manual override cable 56 may be attached to a manual override handle 60 positioned in a convenient and/or secure location, e.g. the automobile trunk or luggage compartment. Operation of the mechanical override is accomplished by pulling on the handle 60, thereby causing plunger 14 to retract further into the housing than it does during normal operation. In the illustrated embodiment, pulling handle 60 causes the end 52 of the cam follower 26 to be moved from its closed position in portion 72 of the track 54 into an override portion 100 of the track, allowing plunger 14 to be drawn further into the housing until a hard stop is reached.

As the handle 60 is pulled, cable 56 draws the plunger 14 back toward the rear of the housing 12, causing a downwardly extending portion 62 (FIG. 4) of the plunger 14 to impact the override tooth 64 on output gear 22. In an alternative embodiment, an output gear 22a, as shown in FIG. 8, may be provided, and the downwardly extending portion 62 may be positioned to contact an override pin 63 extending from a face 65 of the gear. Other configurations for causing engagement of a feature on the plunger with a feature on the gear will be apparent to those skilled in the art.

As the portion 62 contacts the gear, the output gear 22 is rotated in a counterclockwise direction to force the end 30 of locking arm 24 out of catch 32. This results in manual sequencing of the locking arm 24 to the unlocked position 30", with the end 52 of the cam moving into the upper portion 82 of the track and then into portion 86 of the track to allow the plunger to extend outward. When the cable handle is released, the plunger spring 15 extends the plunger and moves the unlocked door to the open position. In one embodiment of the invention, a cable guide 59 may be provided to guide movement of plunger 14 via cable 56. Also, an extra length of cable 61 may be provided for cable 56, sufficient to prevent activation of the manual override by mere inadvertent pulling of cable 56 or handle 60.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention.

What is claimed is:

1. A fuel filler door actuator for controlling the position of a fuel filler door, said actuator comprising:
    a housing;
    an alternate action mechanism having a plunger portion, said plunger portion being configured to move alternately between a first inward position relative to said housing and an outward position relative to said housing upon movement of said door into engagement with said plunger; and
    a locking arm coupled to an electric motor through a gear train, said arm being positionable to engage a latch on said door in a door lock condition by energization of said motor in a first direction when said plunger portion is in said inward position, and being positionable to disengage the latch on said door in a door unlock condition by energization of said motor in a second direction.

2. A fuel filler door actuator according to claim 1, wherein said plunger is positionable in a second inward position which is further inward relative to said housing than said first inward position, and wherein said plunger includes a portion positioned to contact a feature on a gear in said gear train when said plunger is in said second inward position for rotating said gear and thereby moving said arm from said door lock condition to a door unlock condition.

3. A fuel filler door actuator according to claim 2, wherein said feature is an override tooth on said gear, said override tooth being larger than a plurality of drive teeth on said gear.

4. A fuel filler door actuator according to claim 2, wherein said feature is a pin extending from a face of said gear.

5. A fuel filler door actuator according to claim 2, wherein said actuator further comprises a cam follower, and wherein said plunger includes a cam track having an override portion, said cam follower having a portion disposed in said override portion when said plunger is in said second inward position.

6. A fuel filler door actuator according to claim 1, wherein said actuator further comprises a cam follower, said cam follower having a portion disposed in a cam track in said plunger.

7. A fuel filler door actuator according to claim 6, wherein said cam track includes an open portion at a bottom of said plunger.

8. A fuel filler door actuator according to claim 1, wherein said gear train comprises an output gear coupled to said arm through an eccentric pin.

9. A fuel filler door actuator according to claim 8, wherein said eccentric pin includes a portion disposed in a slot in said arm.

10. A fuel filler door actuator according to claim 1, wherein said motor is substantially sealed in a cavity in said housing.

11. A fuel filler door actuator for controlling the position of a fuel filler door, said actuator comprising:
    a housing;
    a spring-biased plunger slidably disposed within said housing, said plunger including a cam track and being configured for engagement by said fuel filler door,
    a cam follower having a portion disposed in said cam track, said cam track defining a path of travel for said plunger with respect to said housing whereby said plunger alternates between a first inward position and an outwardly extended position each time an inward force is applied to said door; and
    a locking arm coupled to an electric motor through a gear train, said arm being positionable to engage a latch on said door in a door lock condition by energization of said motor in a first direction when said plunger portion is in said inward position, and being positionable to disengage the latch on said door in a door unlock condition by energization of said motor in a second direction.

12. A fuel filler door actuator according to claim 11, wherein said plunger is positionable in a second inward position which is further inward relative to said housing than said first inward position, and wherein said plunger includes a portion positioned to contact a feature on a gear in said gear train when said plunger is in said second inward position for rotating said gear and thereby moving said arm from said door lock condition to a door unlock condition.

13. A fuel filler door actuator according to claim 12, wherein said feature is an override tooth on said gear, said override tooth being larger than a plurality of drive teeth on said gear.

14. A fuel filler door actuator according to claim 12, wherein said feature is a pin extending from a face of said gear.

15. A fuel filler door actuator according to claim 12, wherein said cam track has an override portion, and wherein said cam follower includes a portion disposed in said override portion when said plunger is in said second inward position.

16. A fuel filler door actuator according to claim 11, wherein said cam track includes an open portion at a bottom of said plunger.

17. A fuel filler door actuator according to claim 11, wherein said gear train comprises an output gear coupled to said arm through an eccentric pin.

18. A fuel filler door actuator according to claim 17, wherein said eccentric pin includes a portion disposed in a slot in said arm.

19. A fuel filler door actuator according to claim 11, wherein said motor is substantially sealed in a cavity in said housing.

20. A fuel filler door actuator for controlling the position of a fuel filler door, said actuator comprising:

an electric motor;

a locking arm coupled to said electric motor through a gear train, said arm being positionable to engage a latch on said door in a door lock condition by energization of said motor in a first direction and being positionable to disengage the latch on said door in a door unlock condition by energization of said motor in a second direction, said gear train including an output gear having an eccentric pin extending from a surface thereof, said eccentric pin having a portion disposed in a slot in said locking arm;

and a housing, wherein said arm includes a first end pivotaly secured to said housing and a second end for engaging said latch.

* * * * *